(12) United States Patent
Wisniewski

(10) Patent No.: US 7,555,844 B2
(45) Date of Patent: Jul. 7, 2009

(54) CLAMPING DEVICE FOR A MACHINE TOOL WITH MEASUREMENT OF A PLANAR SETTING

(75) Inventor: Horst Wisniewski, Aalen (DE)

(73) Assignee: Alfing Kessler Sondermaschinen GmbH, Aalen (DE)

( * ) Notice: Subject to any disclaimer, the term of this patent is extended or adjusted under 35 U.S.C. 154(b) by 0 days.

(21) Appl. No.: 12/286,780

(22) Filed: Oct. 2, 2008

(65) Prior Publication Data
US 2009/0090014 A1   Apr. 9, 2009

(30) Foreign Application Priority Data
Oct. 5, 2007   (DE)   ............ 10 2007 048 121

(51) Int. Cl.
*G01D 21/00*   (2006.01)
(52) U.S. Cl. ............... 33/626; 33/1 M; 33/556
(58) Field of Classification Search ........... 33/626, 33/630, 1 M, 549, 551, 555–558, 560, 561
See application file for complete search history.

(56) References Cited

U.S. PATENT DOCUMENTS

| | | | | |
|---|---|---|---|---|
| 4,135,848 A | * | 1/1979 | Hughes et al. | ........... 408/239 A |
| 4,563,824 A | * | 1/1986 | Baun | ........... 33/568 |
| 5,058,433 A | * | 10/1991 | Wilson et al. | ........... 33/556 |
| RE35,481 E | * | 3/1997 | Wioskowski et al. | ........... 408/70 |
| 5,829,928 A | * | 11/1998 | Harmand et al. | ........... 408/83.5 |
| 5,839,202 A | * | 11/1998 | Tezuka et al. | ........... 33/503 |
| 6,930,275 B2 | * | 8/2005 | Yamazaki et al. | ........... 219/121.67 |
| 7,024,786 B2 | * | 4/2006 | Haimer | ........... 33/556 |
| 7,238,082 B2 | * | 7/2007 | Saxler et al. | ........... 451/5 |
| 2003/0192867 A1 | * | 10/2003 | Yamazaki et al. | ........... 219/121.78 |
| 2008/0150520 A1 | * | 6/2008 | Steinich | ........... 33/700 |

FOREIGN PATENT DOCUMENTS

DE   264 625 A1   2/1989

* cited by examiner

*Primary Examiner*—Yaritza Guadalupe-McCall
(74) *Attorney, Agent, or Firm*—Flynn, Thiel, Boutell & Tanis, P.C.

(57) ABSTRACT

A clamping device for a machine tool for processing workpieces, comprises a clamping body having at least one clamping face for clamping an object to be clamped, in particular a tool or a workpiece, and a sensor arrangement for measurement of a planar setting of a face of the object to be clamped on at the least one clamping face or a possible gap between the face of the object to be clamped and the at least one clamping face. In the case of the clamping device for the machine tool there is a provision such that the sensor arrangement has at one planar setting sensor for the detection of a distance between the at least one planar setting sensor and a portion of the object clamped in the clamping device, projecting laterally in front of the at least one clamping face, and that the at least one planar setting sensor is arranged on a portion, which is set back in relation to the at least one clamping face, of the clamping body.

18 Claims, 3 Drawing Sheets

CLAMPING DEVICE FOR A MACHINE TOOL WITH MEASUREMENT OF A PLANAR SETTING

BACKGROUND OF THE INVENTION

The invention relates to a clamping device for a machine tool for processing workpieces, comprising a clamping body having at least one clamping face for clamping an object to be clamped, in particular a tool or a workpiece, and a sensor arrangement for measurement of a planar setting of a face of the object to be clamped on at the least one clamping face or a possible gap between the face of the object to be clamped and the at least one clamping face.

The machine tool may have a material removing means, as for example a tool or a laser for processing a workpiece. The machine tool may for example be a milling machine, a drilling machine or a lathe, which processes the workpiece by chip cutting.

THE PRIOR ART

A clamping device for a machine tool, for example a lathe, in the form of a power chuck is disclosed in the patent publication DD 264 625 A1. This publication shows a sensor system with planar setting elements arranged on the power operated chuck and connected with the signal responsive induction coils. By the application of the workpiece to the planar setting elements the induction coil is short circuited. Accordingly a planar setting measuring method involving making physical contact is disclosed in this publication.

Furthermore it is known to incorporate compressed air ducts in clamping jaws, which extend in the planar setting faces or, respectively, clamping faces of the clamping jaws. By monitoring the flow or the pressure it is possible to find whether the clamped workpieces are in planar contact. However the compressed air measurement method is prone to failure. For example compressed air inlet openings may be obstructed by dirt from the working space, chips or the like so that the sensor arrangement may incorrectly indicate a workpiece in planar contact with the clamping face if the compressed air ducts are clogged.

In principle in the case of measurement directly on the clamping face or planar face there is always the problem of chips or other refuse on the clamping face interfering with the sensor system.

SHORT SUMMARY OF THE INVENTION

One object of the invention is accordingly to provide an improved clamping device less prone to disorders together with a sensor arrangement for measurement of the planar setting.

In order to achieve this aim in the case of a clamping device for a machine tool of the type initially mentioned there is a provision such that the sensor arrangement has at least one planar setting sensor for the detection of a distance between the at least one planar setting sensor and a portion of the object clamped in the clamping device, projecting laterally in front of the at least one clamping face, and wherein the at least one planar setting sensor is arranged on a portion, which is set back in relation to the at least one clamping face, of the clamping body.

The machine tool is in particular provided for chip cutting machining. The machine tool may however have a laser, for example for severing or notching workpieces or for the provision of a weld seam or the like.

Dirt, chips or the like on the clamping faces or, respectively, planar faces are detected by the sensor arrangement as faults. The chips are not by error interpreted as a part of the object to be clamped, as for example as a workpiece or tool. In fact chips or other refuse will lead to there being a greater distance between the planar setting sensor on the one hand and the object to be clamped on the other hand so that the failure to ensure a planar setting or an imperfectly planar one will be recognized.

The machine tool is preferably a machine tool for processing by chip removal, for example a milling machine and/or a lathe and/or a drilling machine. Furthermore the machine tool may also be designed for laser machining, for example in laser erosion machining or the like.

The measurement may for example be performed without interruption of operation or during changing the object to be clamped, for example a workpiece or a tool. If then an imperfection in the planar setting is detected, the clamping operation is best repeated.

The sensor arrangement in accordance with the invention involves substantially less wear, because no sensors are provided on the mechanically loaded clamping face.

The planar setting sensor is preferably a distance-responsive sensor. Now it is possible for a distance measured by the planar setting sensor, to be analyzed by a means which is separate and/or remote from the sensor arrangement, for example a control of the machine tool. The sensor arrangement however preferably possesses evaluating means, as for example an evaluating instrumentality or an intelligent planar setting sensor, which is designed for producing signal indicating a planar setting or a gap between the at least one clamping face and the object to be clamped, such planar setting signal being produced on the basis of a measurement of the distance from the laterally projecting portion of the object to be clamped. For example a comparison of limit values with the respective distance value may produce a digital planar setting signal as a go or no-go signal, i. e. that the planar setting has been reached or not.

The sensor arrangement preferably has several planar setting sensors, for example two, three or more planar setting sensors. In the case of several planar setting sensors it is an advantage for them to be positioned at the same distance apart. For example the planar setting sensors can be in the apical parts of an equilateral polygon such as a triangle or square. Accordingly a planar setting and different positions of the clamping body may be detected.

The clamping body may be polygonal or preferably furthermore annular, for example when it is constituted by a spindle. The planar setting sensors are preferably arranged on an end face of the annular clamping body. In this case it is an advantage for the planar setting sensors to have the same angular distance between them.

The clamping body may possess several clamping faces, for example on a segmented clamping portion at which the clamping faces are spaced apart. Between the clamping faces there are portions set back in relation to them, on which in each case one or more planar setting sensors may be arranged. It will be clear that one respective planar setting sensor does not have to be present at each of the set back portions.

Admittedly it would also be conceivable to use a sensor making physical contact. Preferably however the sensor is a sensor acting without physical contact, for example a capacitive sensor an inductive sensor or an ultrasonic sensor. It will be apparent that hybrid measurement principles may be employed, as for example capacitive or inductive and ultrasonic, in the case of a planar setting sensor positioned in accordance with the invention as an advantage.

The sensor arrangement preferably has a wireless interface for contact-free measurement value transmission and/or for the input of operating power. This operating power may for example be employed for the operation of at least one planar setting sensor or also of an associated evaluating means. Contact-free measurement value transmission or power transmission is more particularly advantageous, when the clamping device is not stationary and is movable.

However in the case of movable clamping devices as well it is possible to provide an advantageous measurement transmission or power transmission involving making physical contact. It is in fact namely an advantage to have a motor-driven interface making physical contact at the sensor arrangement. When the clamping device is stationary, for example for changing tools or changing workpieces, the physically touching contacts are brought into contact with each other and following the measurement of the planar setting are separated again. As compared with plugging contact members there is less wear. For the actuation of the physically touching contacts rotary drives and/or linear drives, as for example electrical drives, pneumatic rotary or linear drives or the like may be used. The drive is advantageously arranged on a clamping device holder or clamping device bearing in a stationary manner.

The planar setting sensor arranged on the set back portion of the clamping body or the planar setting sensors arranged on the set back are preferably provided for measurement of a planar setting or position at the end of the object to be clamped on the clamping device. The clamping device may for example extend in the direction of the axis of rotation of a spindle.

It is an advantage for the sensor arrangement to possess at least two planar setting sensors associated with one respective clamping face, such clamping faces being set at an angle to each other. The measurement ranges of the at least two planar setting sensors are also at an angle in a corresponding manner. As such this principle of finding one respective planar setting at clamping faces placed at an angle to one another, constitutes an invention in its own right. This is more particularly advantageous in connection with hollow shank taper tools, in the case of which a terminal planar setting on the one hand and on the other hand a planar setting of a conical clamping portion of the tool is found at the corresponding conical face of the clamping device.

In accordance with the principle of the invention at least one of the planar setting sensors is arranged on a set back portion body alongside the respective clamping face.

As already observed there is the advantage of being able to provide for terminal side planar setting with the principle of the invention. However circumferential planar setting measurement is possible as well. Thus the sensor arrangement will preferably have at least one circumferential planar setting sensor responsive to a planar setting of an outer periphery of the object to be clamped at the inner periphery of socket for an object to be clamped in the clamping device. The outer periphery may for example be an outer periphery of a clamped end of a tool, whereas the inner periphery is provided at a tool socket.

The circumferential planar setting sensor is best set back behind an inner peripheral outline of the socket for the object to be clamped for contact measurement of the outer periphery. For example the circumferential planar setting sensor can be so far set in a channel that it is not touched by the clamped object. It is however also possible for the circumferential planar setting sensor, in accordance with the principle of the invention, to be arranged on a set back portion of the inner circumferential outline of the clamping body.

The socket for the object to be clamped is, as already indicated above, preferably conical, and may for example however also be round or polygonal. The at least one circumferential planar setting sensor is preferably provided for checking a circumferential planar setting, and more particularly a cone seat planar setting, of the object to be clamped at the inner periphery of the socket for the object to be clamped. Accordingly a measurement is possible athwart the clamping direction, and for example athwart the axis of rotation of a spindle.

The clamping device is for example the rotor of a tool or workpiece spindle.

Further advantages and features of the invention will be gathered from the following detailed description of embodiments thereof with reference to the accompanying drawings.

LIST OF THE SEVERAL VIEWS OF THE FIGURES

DETAILED ACCOUNT OF WORKING EMBODIMENTS OF THE INVENTION

Figure 1:
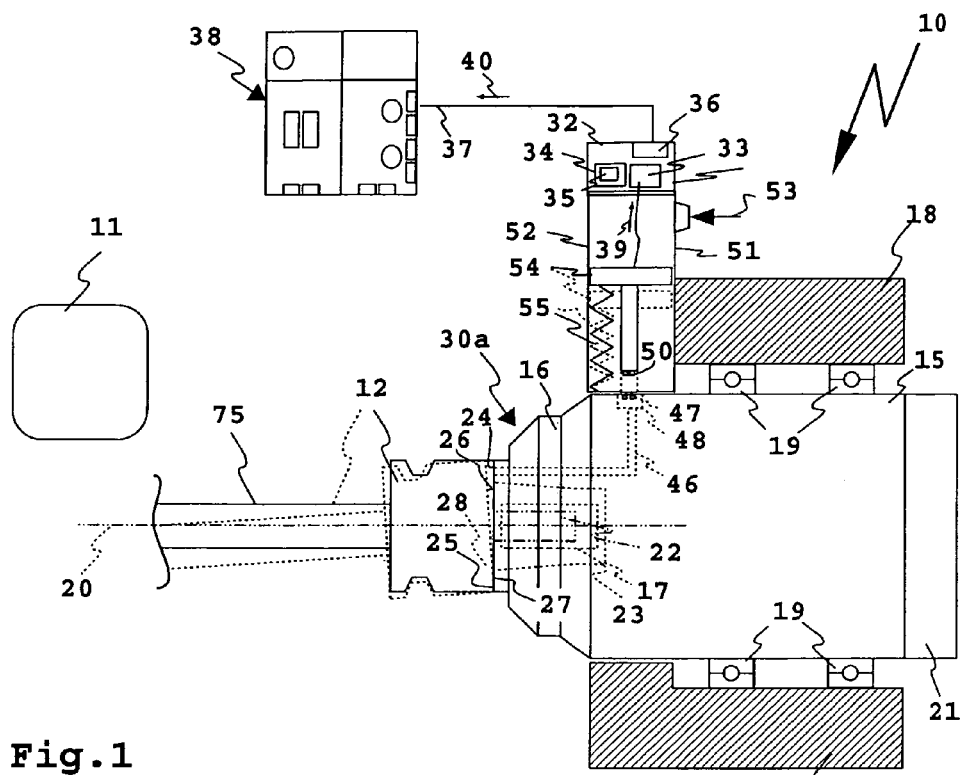
FIG. 1 shows a diagrammatic partial view of a machine tool with one spindle.

In the case of the working examples described in the following similar or functionally equivalent components are provided with the same reference numerals.

A machine tool 10 represented only in part serves for processing workpieces 11, which are also only diagrammatically depicted, as for example castings or other metal parts, by means of a tool 12. The tool 12 constitutes a material removing means 75. The tool 12 is a tool for chip removing machining, as for example a milling cutter or a lathe tool. The tool 12 constitutes an object 14 to be clamped, which is held by a clamping device 13 of the machine tool 10. The clamping device 13 is provided on a spindle rotor 16 of a spindle 15. The tool 12 is plugged into a tool socket 17 in the spindle 15 and clamped therein.

The spindle rotor 16 supported in a rotatable manner on a spindle holder 18 with the aid of spindle bearings 19 for rotation about an axis of rotation 20. The spindle 15 is driven by a motor 21.

A shank 22 of the tool 12 is clamped in a tool holder 23 of the clamping device 13. The tool holder 23 of the clamping device 13 is a so-called hollow shank taper (HST) tool socket. The tool holder 23 clamps a face of the object 27 to be clamped against an end side 26 or front side of the object to be clamped against clamping faces 25 of the spindle 15. The clamping faces 25 are arranged like circular segments on the end side 24, a set back end face 29 of the end side 24 being located between two clamping faces 25. The clamping faces 25 are arranged at the end side 24 along a circle. The face 27 of the object to be clamped is a planar face of the tool 12, which ideally lies in planar manner on the clamping faces 25.

It would admittedly for example be possible in principle to sense the planar setting or alignment of the face 27 of the object to be clamped using conventional sensors, for example by means of sensors arranged on the faces 25 to be clamped.

The latter would however be mechanically loaded and might for example wrongly interpret chips on the face 25 to be clamped as the workpiece 11 in planar engagement. In the case of the machine tool 10 a different design is selected in accordance with the invention, in the case of which a sensor arrangement 30a monitors the planar setting of the face 27 of the object to be clamped on one or more of the clamping faces 25. When that planar setting does not exist, i. e. for example in the case of an oblique setting of the tool 12 in relation to the axis 20 of rotation with a gap 28 between the face 27 of the object to be clamped and a respective clamping face 25, such state is detected by the sensor arrangement 30a.

The sensor arrangement 30a has planar setting sensors 31a, 31b and 31c for sensing the planar setting of the face 27 of the object to be clamped on one or more clamping faces 25. On the basis of planar setting measured values or data 39 from the planar setting sensors 31a, 31b and 31c an evaluating means 32 detects a planar setting or, respectively, any gap 28 present and on the basis of the planar setting data 29 sends a planar setting signal 40 to a control 38 of the machine tool 10.

A processor 33 of the evaluating means 32 evaluates the planar setting data 39 on the basis of an evaluating module 35, which is held in a memory 34 of the evaluating means 32 and contains a program code able to be implemented by the processor 33. In the memory 34 it is best for reference data to be held for the planar setting data 39. A line 37 between the evaluating means and the control 38 is connected with the transmission and reception interface 36 of the evaluating means 32. It will be apparent that wireless transmission of the planar setting signal 40 is also possible.

The planar setting sensors 31a, 31b and 31c are however not arranged on the mechanically loaded clamping faces 25 but on the set back end faces 29 and accordingly arranged on end faces 29 set back in relation to the clamping faces 25, i. e. on set back portions 41 of an annular clamping body 42a, on whose front end side 24 the clamping faces 25 are formed in the manner of circular segments. A planar setting sensor 31a, 31b and 31c is not arranged on every set back portion 41 but in the present case on every second set back portion 41. However more or less planar setting sensors than three planar setting sensors are possible.

The planar setting sensors 31a, 31b and 31c detect a respective distance 43 from a portion 41 to be clamped of an object 14 projecting in front of the at least one clamping face 25 to the side. The portion 41 of the object to be clamped is as it were a lateral extension of the face 27 of the object to be clamped lying against the face 25 to be clamped. The sensor arrangement 30a detects, on the basis of the respective distance 43 a planar setting or the absence thereof, at which for example the gap 28 is present.

Figure 3:
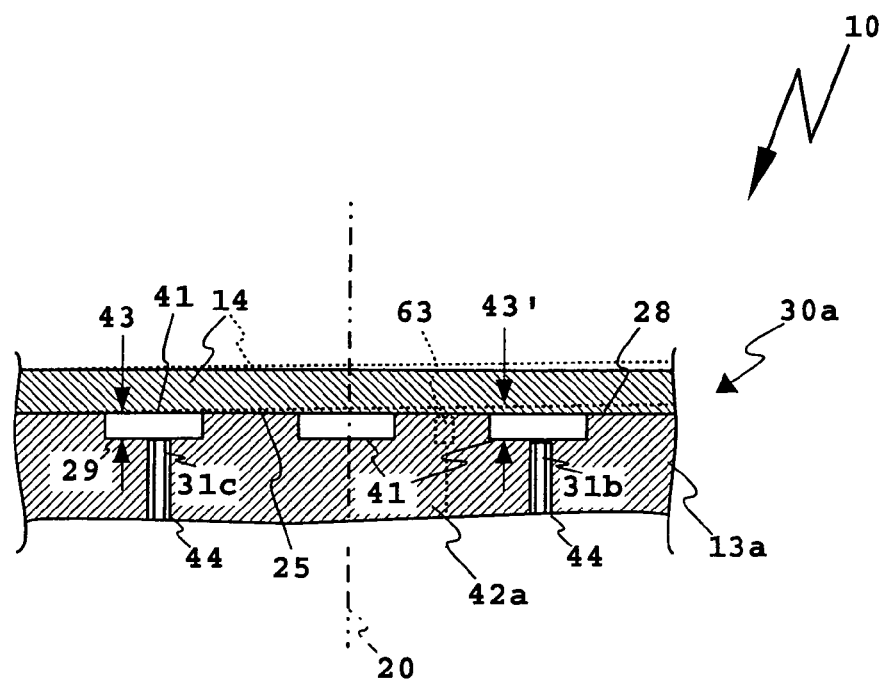
FIG. 3 is a cross sectional view of the spindle along a section line A-A in FIG. 2.

If the object 14 to be clamped does not lie in a planar manner against the clamping faces 25, there is a gap 28. For example the planar setting sensor 31b, depicted in diagrammatically in FIG. 3, will then detect a greater distance 43'. Although the distance 43 is larger even in the case of the planar setting sensor 31c, it is smaller than the distance 43' in the case of the planar setting sensor 31b. A high degree of measuring accuracy and operational reliability is achieved because several planar setting sensors are provided and the planar setting sensor 31a, 31b and 31c are arranged at a substantially equal angular distance apart on the end side 24 of the clamping body 42a. For example the planar setting sensors 31a, 31b and 31c are arranged in the corner photographs of an isosceles triangle.

The planar setting sensors 31a, 31b and 31c are contact-free sensors, as for example capacitive, inductive or ultrasonic sensors.

Figure 2:
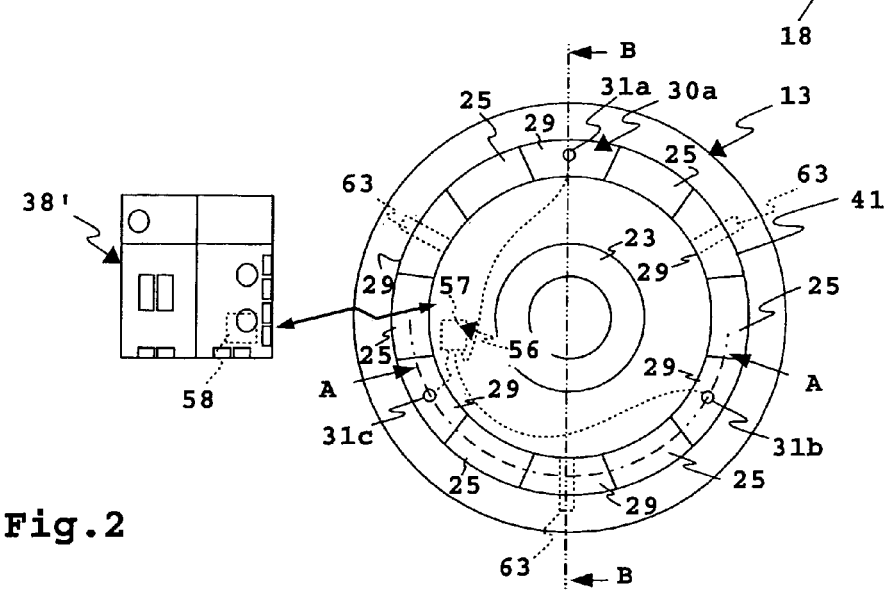
FIG. 2 is a front view of the spindle of FIG. 1.

The planar setting sensors 31a, 31b and 31c are placed in channel-like sensor sockets 44 so that they are protected against effects of the environment. The sensor sockets 44 may be open at the end, as is indicated in FIG. 2, or may be closed by protective caps 45 at the end thereof end so that the planar setting sensors 31a, 31b and 31c are protected against environmental effects, such as chips, cutting fluid or the like.

The sensor sockets 44 are terminal portions of channels 46, which lead to physically touching or acting contacts 47, provided stationarily on the spindle rotor 16, of a physically acting contact interface 48. The physically acting contacts 47 are for example arranged on a contact board and connected via lines 49 with the planar setting sensors 31a and 31b.

The physically acting contact interface 48 furthermore comprises moving contacts 50 which are power driven. For this purpose a linear drive 51 is provided, as for example a pneumatic cylinder 52 operated with compressed air 53. The moving contacts 50 are for example arranged on the piston 54 or a piston rod projecting therefrom of the cylinder 52. When the cylinder 52 is supplied with compressed air 53 the moving contacts 50 touch the physically acting contacts 47 so that the physically acting contact interface 48 is closed for the transmission of power, for example from the evaluating means 32 to the planar setting sensors 31a, 31b and 31c and/or for the transmission of measurement data from the planar setting sensors 31a, 31b and 31c to the evaluating means 32. The resetting of the piston 54 may also take place using compressed air or by means of a return spring 55, which on actuation of the piston 54 is tensioned by it and applies a return force acting toward an open position of the physically acting contact interface 48.

The physically acting contact interface 48 is closed on still-stand of the spindle 15, for example on changing a workpiece or tool. In the case of a transmission design free of physical contact, i. e. in a wireless fashion, using a wireless interface 56, which is illustrated as an alternative system in FIG. 2, it is unnecessary for the clamping device 13 to be stationary, when the sensor arrangement 30a transmits measured data or receives power. The planar setting sensors 31a, 31b and 31c are then connected with a transmitter and receiver 57 for wireless data transmission and for wireless power reception, such receiver 57 communicating with a corresponding transmitter and receiver 58 of a control 38' employed in lieu of the control 38. The control 38 for example performs an analysis of the data and accordingly detects the planar setting in a manner similar to the evaluating means 32. For example the control 38' will comprise the evaluating module 35 and also a processor for implementing its program code.

The tool socket 17 is a socket for hollow taper tools. The tool socket 17 constitutes a socket 60 for an object 14 to be clamped. The socket 60 for the object to be clamped has a conical inner periphery 61, corresponding to the outer periphery 61, also conical, of the tool shank 22. In the clamped condition of the tool 12 its outer periphery 62 will ideally make planar engagement with the inner periphery 61. To detect this planar state peripheral planar setting sensors 63 of the sensor arrangement 30 are provided. The peripheral planar setting sensors 63 are also incorporated in the clamping body 42 and are located in channel-like sensor sockets 64 protected against environmental effect as for example chips, cutting fluid or the like. Lines 66 lead from the sensor sockets 64 for the connection of the physically acting contact interface 48 with the peripheral planar setting sensors 63. The lines 66 are arranged in a protected manner in channels 65, which like the channels 46 lead to the physically acting contact interface 48.

The peripheral planar setting sensors 63 are arranged set back behind a inner peripheral outline 67 of the socket 60 for the object to be clamped. The sensor sockets 64 are preferably shut off at the end by protective caps 68 at the inner periphery 67 so that the peripheral planar setting sensors 63 are additionally safeguarded.

The inner peripheral outline 67 and the clamping faces 25 are at an angle to one another. The measurement parts 71 of the planar setting sensors 31a, 31b and 31c measuring at the end and the measuring parts 72 of the peripheral planar setting sensors 63 are correspondingly also at an angle.

The tool shank 22 is a so-called hollow shank, which is able to be clamped by a clamping set 69 indicated diagrammatically. The clamping set 69 fits in a cavity 70 in the tool shank 22 and during clamping in the direction of the axis thrusts a conical outer wall of the tool shank 22 radially outward against the planar setting inner peripheral outline 67 of the sockets 60 for the object to be clamped or respectively the tool socket 17.

Figure 5:
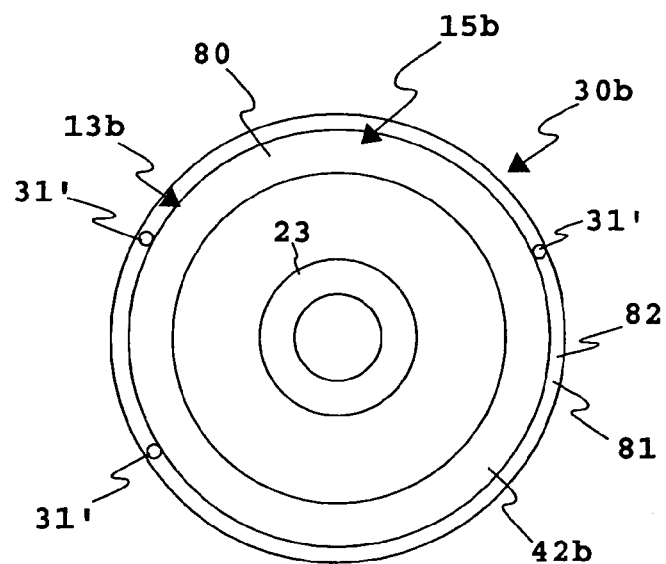
FIG. 5 shows a further spindle with a further working example of a sensor arrangement generally identical to the view in accordance with FIG. 2 on a larger scale.
Figure 4:
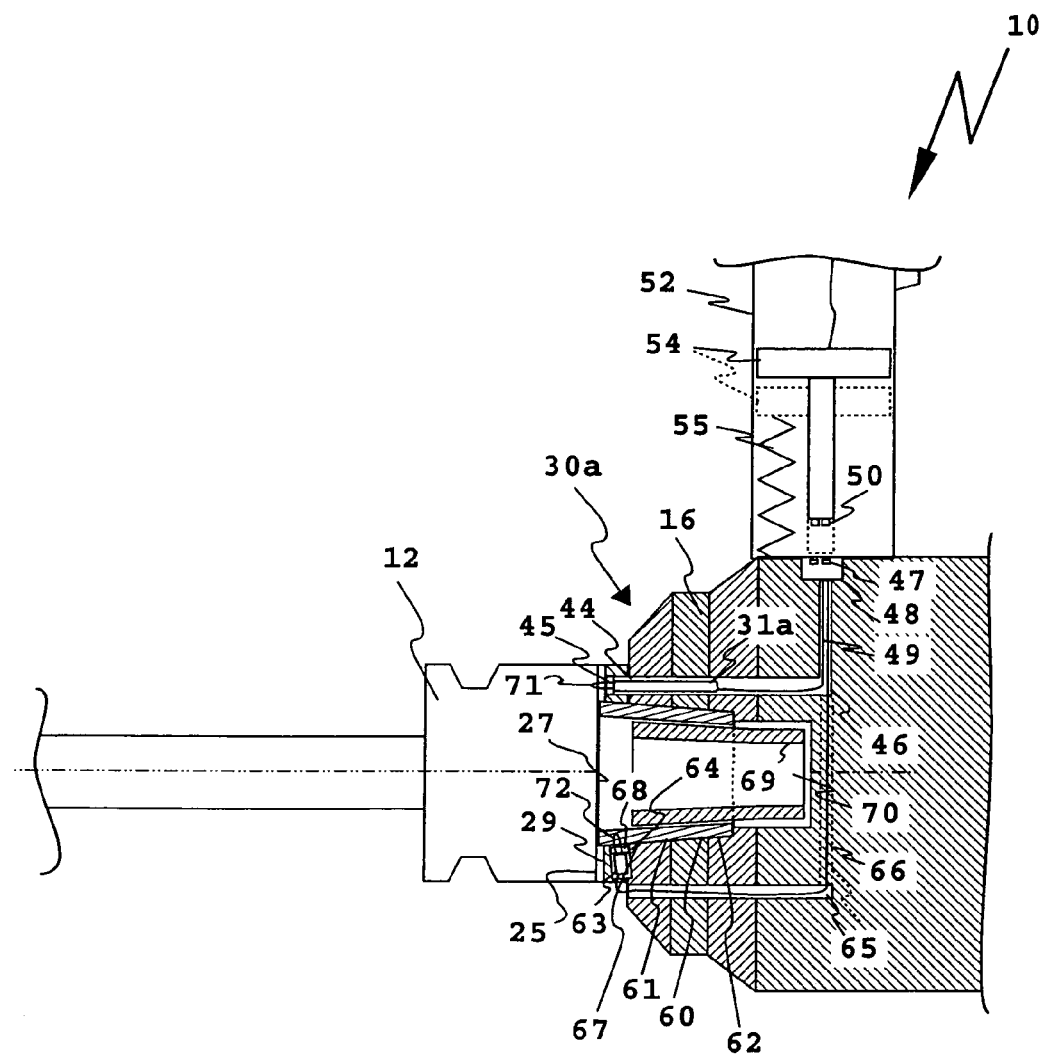
FIG. 4 shows a partial cross sectional view of the spindle in accordance with FIG. 1 along a line B-B in FIG. 2.

The design in accordance with the invention is also applicable to clamping faces which are not segmented. Thus for example a clamping device 13b illustrated in FIG. 5, which comprises a spindle 15b, has an annular clamping face 80 in relation to which an adjacent annular face 81 is set back. The annular face 81 constitutes a portion 82 which is set back in relation to the clamping face 80, and planar setting sensors 31b are arranged on the portion 82. In a manner similar to the planar setting sensors 31a, 31b and 31c the planar setting sensors 31' are not mechanically loaded, when they check the planar setting of an object to be clamped, as for example of the tool 12 on the annular clamping face 80.

The invention claimed is:

1. A clamping device for a machine tool for processing workpieces, comprising a clamping body having at least one clamping face for clamping an object to be clamped, in particular a tool or a workpiece, and a sensor arrangement for measurement of a planar setting of a face of the object to be clamped on at the least one clamping face or a possible gap between the face of the object to be clamped and the at least one clamping face, wherein the sensor arrangement has at least one planar setting sensor for the detection of a distance between the at least one planar setting sensor and a portion of the object clamped in the clamping device, projecting laterally in front of the at least one clamping face, and wherein the at least one planar setting sensor is arranged on a portion, which is set back in relation to the at least one clamping face, of the clamping body opposite the portion of the clamped object.

2. The clamping arrangement in accordance with claim 1, wherein the sensor arrangement has at least two and preferably at least three planar setting sensors.

3. The clamping arrangement in accordance with claim 2, wherein the planar setting sensors of the sensor arrangement are arranged in a substantially equidistant manner to one another.

4. The clamping arrangement in accordance with claim 3, wherein the clamping body is annular and the planar setting sensors are arranged more particularly at an equal angular distance apart on an end side of the clamping body.

5. The clamping arrangement in accordance with claim 1, wherein the clamping body has a segmented clamping portion with several clamping faces arranged at a distance apart and portions between the clamping faces set back in relation to the clamping faces, at least one planar setting sensor being arranged on one or more of the set back portions in each case.

6. The clamping arrangement in accordance with claim 1, wherein the at least one planar setting sensor is a sensor for operation without physical contact.

7. The clamping arrangement in accordance with claim 1, wherein the sensor arrangement and more particularly the planar setting sensor, is designed for producing a planar setting signal indicating a planar setting or a gap between the at least one clamping face and the face of the object to be clamped on the basis of a measurement of the distance from the laterally projecting portion of the object to be clamped.

8. The clamping arrangement in accordance with claim 1, wherein the sensor arrangement comprises a motor driven physically acting contact interface for measured data transmission and/or power transmission.

9. The clamping arrangement in accordance with claim 8, wherein the physically acting contact interface has stationarily arranged physically acting contacts on the clamping device and moving contact able to be driven by a drive, more particularly a linear drive.

10. The clamping arrangement in accordance with claim 1, wherein the sensor arrangement has wireless interface for wireless measured data transmission and/or for reception of operating power.

11. The clamping arrangement in accordance with claim 1, wherein the at least one planar setting sensor arranged on the at least one set back portion of the clamping body is provided for measurement of the end side planar setting of the object to be clamped.

12. The clamping arrangement in accordance with claim 1, wherein the clamping body has an end side annular support body for the object to be clamped and wherein the at least one planar setting sensor is provided for checking an end side or front side planar setting of the object to be clamped on the annular support body.

13. The clamping arrangement in accordance with claim 1, wherein the sensor arrangement comprises at least one peripheral planar setting sensor for checking a planar setting of an outer periphery of the object to be clamped on an inner periphery of a socket for the object to be clamped of the clamping device.

14. The clamping arrangement in accordance with claim 13, wherein the at least one peripheral planar setting sensor for measurement of the outer periphery without physical contact of the object to be clamped is set back behind an inner periphery outline of the socket for the object to be clamped.

15. The clamping arrangement in accordance with claim 13, wherein the inner periphery of the socket for the object to be clamped is conical and wherein the at least one peripheral planar setting sensor is provided for measurement of a conical seat planar setting of the object to be clamped on the conical inner periphery of the socket for the object to be clamped.

16. The clamping arrangement in accordance with claim 1, wherein the sensor arrangement comprises at least two planar setting sensors arranged respectively on a clamping face, the clamping faces being arranged at an angle to each other and wherein measurement portions of the at least two planar setting sensors are at a angle to each other.

17. The clamping arrangement in accordance with claim 1, wherein the clamping device comprises a spindle.

18. A machine tool with a clamping arrangement in accordance with claim 1.

* * * * *